May 16, 1933. E. E. WILSON 1,909,511

MUFFLER

Filed Nov. 1, 1929

Inventor
Ernest E. Wilson

By Blackmore, Spencer & Flint
Attorneys

Patented May 16, 1933

1,909,511

UNITED STATES PATENT OFFICE

ERNEST E. WILSON, OF DETROIT, MICHIGAN, ASSIGNOR TO GENERAL MOTORS RESEARCH CORPORATION, OF DETROIT, MICHIGAN, A CORPORATION OF DELAWARE

MUFFLER

Application filed November 1, 1929. Serial No. 404,020.

It is an object of this invention to provide a device which is adapted to be connected to the air intake conduit of the carburetor of, or to the exhaust pipe of, an internal combustion engine to silence the so-called intake or exhaust noises.

To be suitable for use in such an installation, a muffler should be of such construction that it will have maximum efficiency as a silencer and will offer minimum resistance to the passage of gases therethrough. I have discovered that, by suitably arranging bodies of a suitable sound-absorbing material, preferably enclosed within a suitable casing, around the intake conduit of the carburetor, or the exhaust pipe, of an internal combustion engine, a muffler, which will cause the sound waves issuing from the intake conduit or the exhaust pipe to be dissipated by absorption before they reach the atmosphere, and which will offer practically no resistance to the passage of gases therethrough, may be produced.

To increase the efficiency of the muffler, there may be provided therein, in addition to the bodies of sound-absorbing material, suitably shaped and arranged sound-reflecting surfaces, which will cause dissipation of the sound waves by reflection, and the resulting interference, or the bodies of sound-absorbing material may be so shaped and arranged so as to cause dissipation of the sound waves by reflection, and the resulting interference, as well as by absorption.

For a better understanding of the nature and the objects of the present invention, reference is made to the following specification in which are described the preferred embodiments of my invention which are illustrated in the accompanying drawing.

Figures 1, 2, 3, 4, 5:
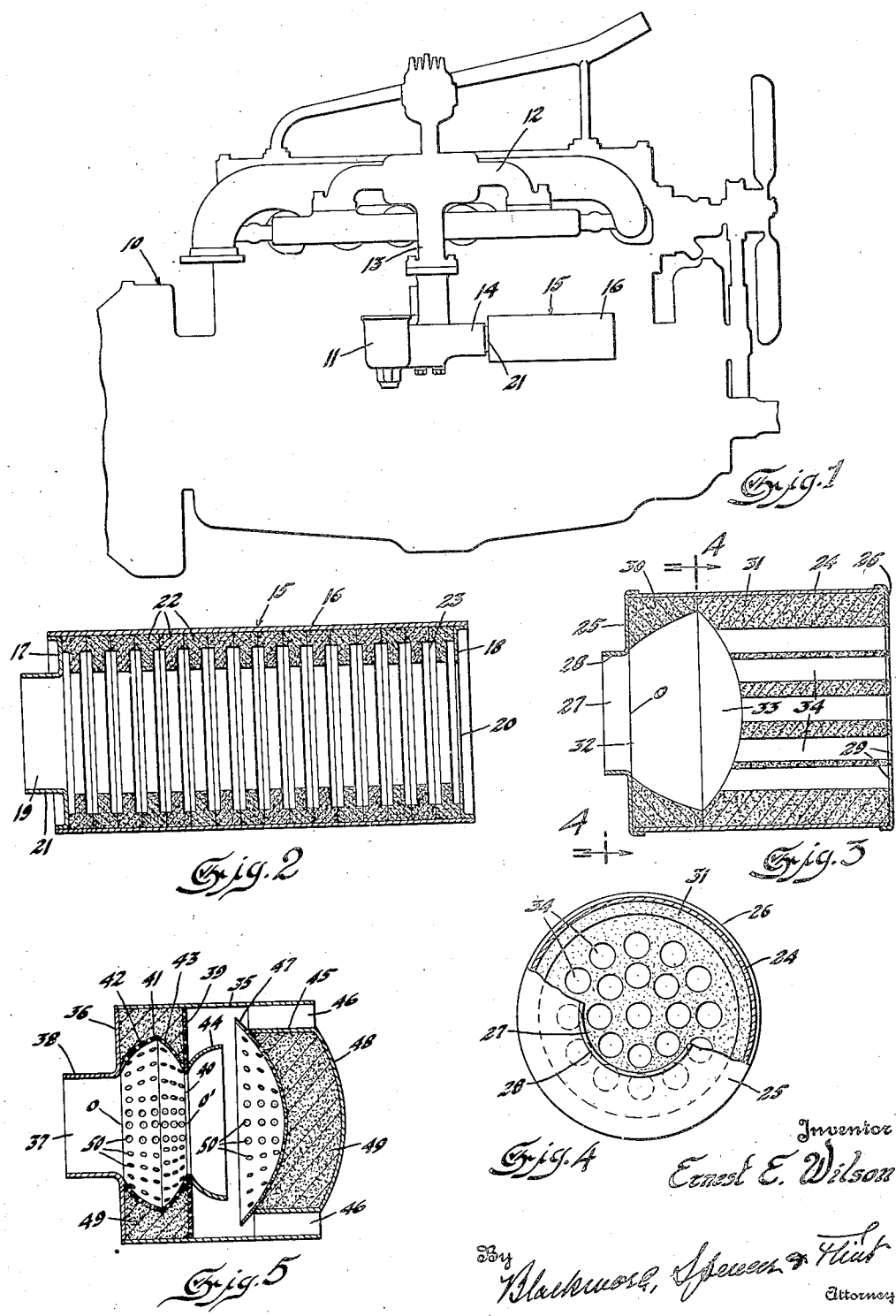
Figure 1 is a side elevation of an internal combustion engine to the air intake conduit of the carburetor of which is connected a muffler in which is embodied my invention.
Figure 2 is a longitudinal section taken through the muffler which is shown in Figure 1.
Figure 3 is a longitudinal section taken through a modified form of muffler.
Figure 4 is a fragmentary section taken substantially on the line 4—4 of Figure 3.
Figure 5 is a longitudinal section taken through a third form of muffler.

In Figure 1 of the drawing, the reference character 10 indicates an internal combustion engine on which there is provided a carburetor 11 which is connected to the intake manifold 12 by a riser 13 and on which there is provided an air intake conduit 14. To the conduit 14, there is connected a muffler 15 which is adapted to prevent any sound waves which are generated in the induction system from passing out of the conduit 14 into the atmosphere.

The muffling device 15, which is shown in Figures 1 and 2 of the drawing, consists of a cylindrical shell 16 of sheet metal whose opposite ends are closed by heads 17 and 18 through which extend large circular openings 19 and 20, respectively. The opening 19 in the head 17 is surrounded by an outwardly extending neck 21, which is adapted to be assembled in telescopic relation with the air intake conduit of a carburetor, as shown in Figure 1.

Between the heads 17 and 18, there are clamped a plurality of annular members 22 whose inner and outer diameters are, respectively, substantialy equal to the diameter of the openings 19 and 20, and the internal diameter of the shell 16. The annular members 22 are made T-shaped in cross section so that when they are assembled with the shell 16, as shown in the drawing, the inner edges thereof will be spaced apart, as indicated at 23. The annular members 22 may be made of any suitable sound-absorbing material, such as "Celotex" "Armstrong insulating brick", "Super Fire-Felt", or a porous ceramic material. In the event that a porous ceramic material is to be employed, I prefer to use one in which there is embedded a wire screen to strengthen the material. In the event that "Celotex" or "Super Fire-Felt" is to be employed, it is preferable, in order to increase the efficiency of the muffler, that the annular members 22 be cut from sheets, so that the inner edges thereof, which form the walls of the central passage through the muffler, will be more porous than if the members were moulded into shape.

As intimated above, the muffler 15 is adapted to be installed on an internal combustion engine with the neck 21 in telescopic relation with the air intake conduit of the carburetor thereof. When the muffler is installed, as described above and illustrated in Figure 1, and the engine is operating, air will be drawn from the atmosphere into the carburetor and engine cylinders through the opening 20, the central passage in the muffler, the opening 19, and the neck 21. Since the passage through the muffler is entirely free from obstructions, the muffler will offer substantially no resistance to the passage of air therethrough. The sound waves which issue from the conduit 14 will enter the central passage in the muffler 15 and will be almost entirely dissipated by absorption by the bodies 22 of sound absorbing material, with which the shell 16 is lined, before they can reach the atmosphere. The provision of the spaces 23 between the inner edges of the several annular members 22 increases the effective sound absorbing area of the sound absorbing material. The spaces 23 also function as expansion chambers, which also aid in the dissipation of the sound waves which issue from the conduit 14.

The muffler, which is illustrated in Figures 3 and 4 of the drawing, includes a cylindrical shell 24 whose opposite ends are closed by heads 25 and 26. Through the head 25, there extends a large circular opening 27 which is surrounded by an outwardly extending neck 28 which is adapted to be assembled in telescopic relation with the air intake conduit of a carburetor. Through the head 26, there extend a plurality of smaller openings 29. Within the shell 24, there are located bodies 30 and 31 of sound absorbing material of the type described above. Through the body 30, there extends a passage 32 whose smaller, outer end is coextensive in area with the opening 27. The walls of the passage 32 are preferably shaped like the surface of a truncated paraboloid which is coaxial with the opening 27, and whose focal point is located at the point 0 which is in the plane of the inner end of the neck 28. In the end of the body 31, which is adjacent the body 30, there is provided a recess 33 whose maximum cross-sectional area is substantially equal to the maximum cross-sectional area of the passage 32 through the body 30. The surface of the recess 33 is preferably shaped like the surface of a paraboloid which is coaxial with the opening 27 and whose focal point is located at the point 0. From the outer end of the body 31 into the recess 33, there extend a plurality of openings 34, which are equal in number to the openings 29 in the head 26 and of which each is alined with one of the openings 29.

The muffler, which is illustrated in Figures 3 and 4 of the drawing, is adapted to be installed on the air intake conduit of the carburetor of an internal combustion engine in the same manner as the muffler which is illustrated in Figures 1 and 2. When the muffler is so installed and the engine is operating, air will be drawn into the carburetor and engine cylinders through the openings 29, the passages 34, the recess 33, the passage 32, the opening 27 and the neck 28, and, since the passage through the muffler is unobstructed, the muffler will offer substantially no resistance to the passage of air therethrough. The surfaces of passage 32 and the recess 33, being shaped and located as described above, will tend to cause any sound waves which issue from the air intake conduit of the carburetor into the muffler to be reflected back to the point 0 or back into the conduit. The interference resulting from the reflection and the partial absorption of the sound waves by the walls of the passage 32 and the recess 33 will prevent the passage of the greater part of the sound waves beyond the walls of the recess 33. Any sound waves which pass the walls of the recess 33 and enter the passages 34 will be almost entirely dissipated by absorption by the walls of the passages before they reach the atmosphere.

The muffler, which is shown in Figure 5 of the drawing, includes a cylindrical shell 35 over one end of which is secured a plate 36 through which extends a circular opening 37 which is coaxial with the shell and is surrounded by an outwardly extending neck 38. The shell 35 is divided longitudinally by a plate 39 through which extends a circular opening 40 which is substantially coaxial with, and is of substantially the same diameter as, the opening 37.

Between the opening 37 and the opening 40, there extends an annular element 41 which consists of two funnel-shaped portions 42 and 43, which may be separately formed and then united, or which may be integrally formed. The smaller end of the portion 42, which is preferably shaped like the surface of a truncated paraboloid which is coaxial with the openings 37 and 40 and whose focal point is located at the point 0 which is located in the plane of the plate 36, is secured circumferentially to the edge of the plate 36 surrounding the opening 37. The smaller end of the portion 43, which is preferably shaped like the surface of a truncated paraboloid which is coaxial with the openings 37 and 40 and whose focal point is located at the point 0, is secured circumferentially to the edge of the plate 39 surrounding the opening 40 and the larger end thereof is circumferentially secured to the larger end of the portion 42.

The smaller end of a funnel-shaped element 44, which is located on the side of the plate 39 opposite that on which the element 41 is located and which is preferably shaped like the surface of a truncated paraboloid which is coaxial with the openings 37 and 40 and whose focal point is located at the point 0' which is located in the plane of the plate 39, is secured circumferentially to the edge of the plate 39 surrounding the opening 40.

Within the end of the shell 35, opposite that to which the plate 36 is secured, there is located a cylindrical shell 45, which is coaxial with the shell 35 and is secured in place therein by suitable spacers 46. The inner end of the shell 45 is closed by a wall 47 which is preferably shaped like the surface of a paraboloid which is coaxial with the openings 37 and 40 and whose focal point is located at the point 0'. The outer end of the wall 47, it will be noted, extends outwardly beyond the wall of the shell 45 but terminates inwardly of the wall of the shell 35. The outer end of the shell 45 is closed by an outwardly convex wall 48.

The space enclosed between the side wall of the shell 35, the plates 36 and 39, and the element 41, and the space enclosed by the inner shell 45 and the walls 47 and 48 is filled with a suitable sound-absorbing material 49, such as mineral wool. Through the element 41, the plate 39, and the wall 47, there extend a plurality of perforations 50.

The muffler, which is illustrated in Figure 5, is adapted to be installed on an internal combustion engine in the same manner as the mufflers which are shown in the preceding figures. When so installed and the engine is operating, air is drawn into the annular passage between the shells 35 and 45, thence, into the central passage which terminates in the neck 38 and, thence, into the carburetor and engine cylinders. Since the passage through the muffler is almost entirely unobstructed, the muffler will offer very little resistance to to the passage of air therethrough.

The muffler illustrated in Figure 5 is, in effect, a two stage silencer. A part of the sound waves which issue from the air intake conduit of the carburetor will pass through the perforation 50 in the element 41 and will be absorbed by the mass of sound absorbing material 49. The part of the sound waves which impinge against the wall of the element 41 will be reflected thereby back to the point 0 or into the air intake conduit of the carburetor. The interference resulting from the reflection, and the partial absorption of the sound waves by the wall of the element 41 will prevent the passage of the greater part of them through the opening 40. A part of the sound waves which pass through the opening 40 will be absorbed by the sound absorbing material within the shell 45, and a part thereof will be dissipated by reflection from the element 44 and the plate 47 back to the point 0' or into the opening 40, and by the interference resulting from the reflection, with the result that substantially none of the audible sound waves will reach the atmosphere.

In the modification of the invention, which is illustrated in Figure 5 of the drawing, instead of perforated sheet metal reflecting surfaces backed by sound-absorbing material, a body of molded sound-absorbing material of the type used in the mufflers shown in Figures 1 to 4 may be employed.

Although I have shown and described preferred embodiments of my invention with great particularity as regards the shape and location of the several elements thereof, it is to be understood that this has been done by way of example and not by way of limitation and that various changes in the shapes and relations of the several elements may be made without departing from the spirit of the invention.

It will, of course, be understood that devices made in accordance with the present invention are not limited to use in muffling the intake noises of internal combustion engines but may also be employed to muffle the exhaust noises and for other analogous purposes.

I claim:

1. In a muffling device, a cylindrical shell, a body of sound-absorbing material within the shell, an opening extending through one end of the shell, a recess in the body of sound-absorbing material communicating with the opening, a plurality of openings in the opposite end of the shell, and a plurality of openings in the body of sound-absorbing material communicating with the last-mentioned openings and the recess in the body of sound-absorbing material.

2. A muffling device which includes a body of sound absorbing material through which extends a continuous straight passage and in which intermediate the ends of the passage there is provided an enlarged recess having opposed walls, of which one is arranged to reflect sound waves onto the other which is arranged to reflect sound waves back into the passage.

3. The invention claimed in claim 2 in which the portion of the passage on one side of the recess consists of a plurality of relatively small passages.

4. The invention claimed in claim 2 in which the opposed walls of the recess are of parti-paraboloidal shape.

5. The invention claimed in claim 2 in which the enlarged recess is located adjacent one end of the body of sound absorbing material.

In testimony whereof I affix my signature.

ERNEST E. WILSON.